US009487659B2

(12) United States Patent
Pech et al.

(10) Patent No.: US 9,487,659 B2
(45) Date of Patent: Nov. 8, 2016

(54) METHOD FOR PRODUCING CARBON BLACK FROM WASTE RUBBER AND DEVICE THEREOF

(75) Inventors: Jean-Louis Pech, Toulouse (FR); Nikolaï Ivanovitch Kalatski, Minsk (BY)

(73) Assignee: Alpha Recyclage Franche Comte, Brevans (FR)

( * ) Notice: Subject to any disclaimer, the term of this patent is extended or adjusted under 35 U.S.C. 154(b) by 280 days.

(21) Appl. No.: 14/111,513

(22) PCT Filed: Apr. 12, 2012

(86) PCT No.: PCT/FR2012/050808
§ 371 (c)(1),
(2), (4) Date: Nov. 21, 2013

(87) PCT Pub. No.: WO2012/140375
PCT Pub. Date: Oct. 18, 2012

(65) Prior Publication Data
US 2014/0072506 A1    Mar. 13, 2014

(30) Foreign Application Priority Data

Apr. 14, 2011   (BY) .................................. 20110480
Apr. 26, 2011   (BY) .................................. 20110536

(51) Int. Cl.
| | |
|---|---|
| C09C 1/48 | (2006.01) |
| C10B 7/10 | (2006.01) |
| C10B 47/44 | (2006.01) |
| C10B 51/00 | (2006.01) |
| C10B 53/07 | (2006.01) |
| C10B 57/12 | (2006.01) |

(52) U.S. Cl.
CPC ................. *C09C 1/482* (2013.01); *C10B 7/10* (2013.01); *C10B 47/44* (2013.01); *C10B 51/00* (2013.01); *C10B 53/07* (2013.01); *C10B 57/12* (2013.01); *Y02P 20/143* (2015.11)

(58) Field of Classification Search
CPC ....... C09C 1/482; C10B 53/07; C10B 47/44; C10B 7/10; C10B 57/12; C10B 51/00
See application file for complete search history.

(56) References Cited

U.S. PATENT DOCUMENTS 5,087,436 A    2/1992 Roy

FOREIGN PATENT DOCUMENTS

| EP | 0693539 A2 | 1/1996 |
| EP | 1785248 B1 | 5/2007 |

(Continued)

OTHER PUBLICATIONS

English machine translation of KR100473763B1.*

*Primary Examiner* — Richard M Rump
(74) *Attorney, Agent, or Firm* — Seed IP Law Group PLLC

(57) ABSTRACT

A method for obtaining carbon black from rubber waste is provided. The method includes the thermal decomposition of rubber waste in a reactor, the separation of the decomposition products into gas-vapor products and into solid carbon-containing residues, the grinding of the carbon residues, the combustion of the gas-vapor products with the ground carbon residues by supplying the gas-vapor products into the combustion chamber, the mass consumption ratio of the gas-vapor products and of the ground carbon residues being between 1:(0.1-2). A device for obtaining carbon black from rubber waste is also provided.

8 Claims, 1 Drawing Sheet

(56) References Cited

FOREIGN PATENT DOCUMENTS

| FR | 2877427 | A1 | * | 5/2006 | ............... C10B 7/14 |
| KR | 100473763 | B1 | * | 3/2005 | |
| RU | 747868 | B | | 7/1980 | |
| RU | 2139187 | C1 | | 10/1999 | |
| RU | 2174911 | C1 | | 10/2001 | |
| RU | 2269415 | C2 | | 2/2006 | |
| RU | 2276170 | C2 | * | 5/2006 | |
| RU | 2352600 | C2 | | 4/2009 | |
| WO | 2008/030137 | A1 | | 3/2008 | |

* cited by examiner

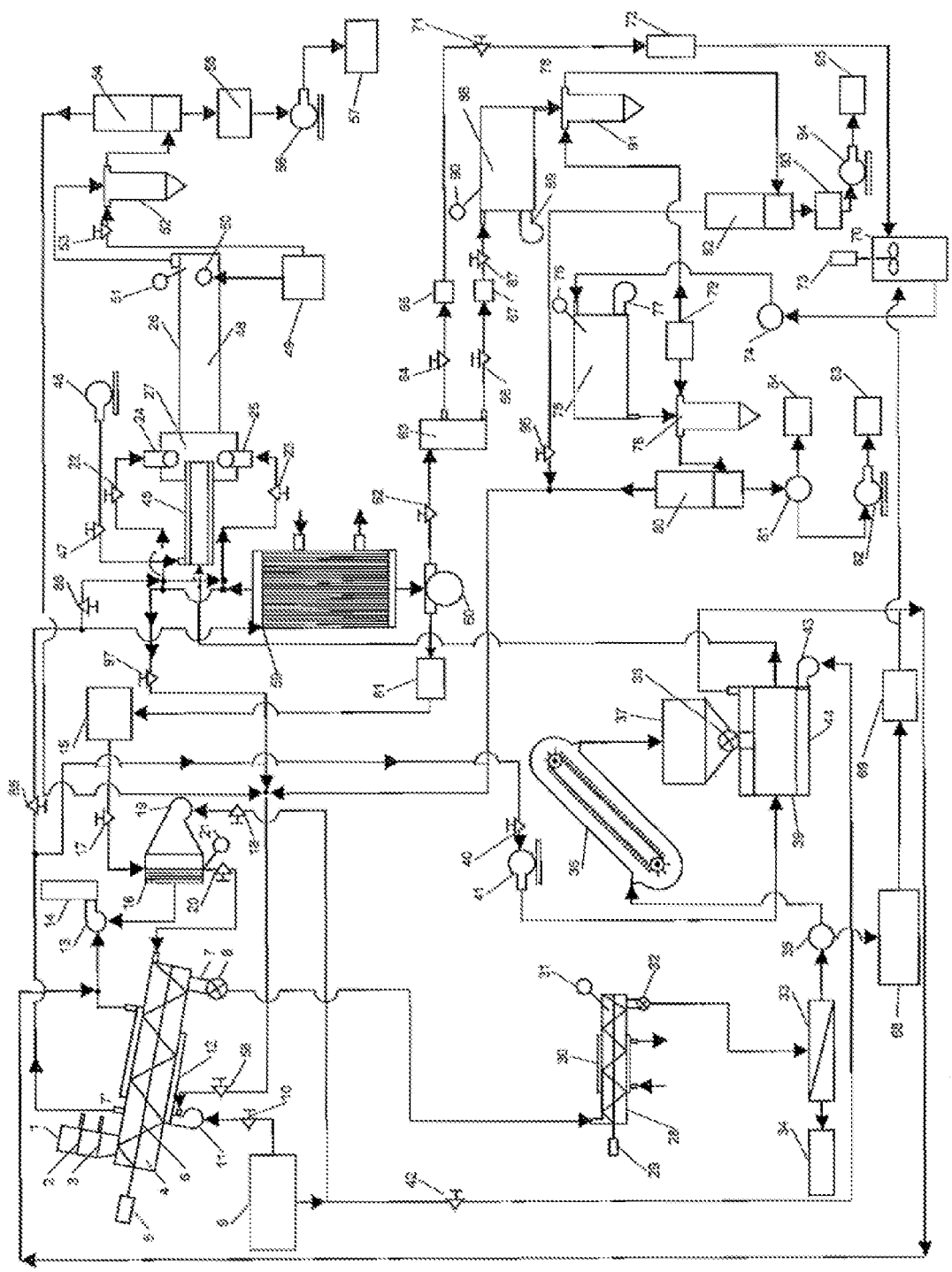

METHOD FOR PRODUCING CARBON BLACK FROM WASTE RUBBER AND DEVICE THEREOF

BACKGROUND

1. Technical Field

The present disclosure relates to the field of waste treatment, and can be used in the chemical industry for the production of carbon black, but also in the rubber industry for the production of components made of rubber mixtures.

2. Description of the Related Art

Several methods for treating scrap tires have been described in the prior art. In particular, U.S. Pat. No. 5,087,436 presents a vacuum pyrolysis method for obtaining carbon soot with temperatures of between 490 and 510° C., an absolute pressure of 5 kPa, an iodine absorption number of between 0.13 and 0.15 kg/kg, a dibutyl phthalate number (80-100) of between 5 and 10 m$^3$/kg, and a tinting strength of between 55 and 63.

The method described in this patent has several drawbacks, including significant energy expenditure during the process and the complexity of introducing the waste into the reactor because of the need to create and maintain the vacuum in the combustion chamber.

Another method for heat treating scrap tires and a device for implementing it are described in Patent RU 2269415, which obtains solid carbon residues (soot) with the following characteristics: iodine number (ml/100 g)—112, light transmittance of toluene extract (%)—98, dibutyl phthalate absorption (ml/100 g)—93.

This method consists of pyrolysis of scrap tires in a reactor at temperatures between 550 and 800° C. in a reducing gas medium obtained by a reducing gas generator, by combustion of the gases containing hydrocarbons and separation of the pyrolysis products. At least part of the gaseous pyrolysis products exiting the reactor with the liquid hydrocarbon vapors is fed to the reducing gas generator and to the heat unit. At least part of the fumes exiting the heat unit is supplied to the reducing gas generator and the reactor.

The scrap tire heat treatment unit that implements this method comprises a reactor, a system for discharging the gases that form in the reactor, a reducing gas generator connected to the reactor, a crushed tire supply system, and a receiving tray for solid pyrolysis residues. The unit is equipped with a heating device that has means for discharging waste gases, the system for evacuating the gases formed in the reactor being connected to the reducing gas generator and the reactor.

The disadvantages of this method lie in the significant energy expenditures required to implement the method due to the need to produce a reducing gas by incomplete combustion of hydrocarbons, as well as the complexity of introducing the waste into the reactor.

Patent RU 2174911 describes another method for treating waste rubber, including thermal decomposition in a gas-vapor medium, separation of the decomposition products into solid and gaseous products, feeding of solid decomposition products into an activation furnace while simultaneously supplying steam to a furnace in an amount between 0.8 and 1.6 kg per kilogram of solid decomposition products, evacuation of the gas mixture from the activation furnace with a mass ratio for the mixture of between 3 and 0.6 for water vapor and 1 for activation gas, and their use as the gas-vapor medium for the waste decomposition, the feeding into the activation furnace—while simultaneously supplying solid decomposition products and steam—of waste rubber in an amount between 0.05 and 0.20 kg of waste per 1 kg of solid products, leading to the production of activated charcoal.

The disadvantages of this method include high energy consumption when the method is carried out and significant emission of harmful combustion products into the environment.

Patent RU 2139187 describes a heat treatment method for scrap tires in which the tires are loaded into a reactor where the material undergoes pyrolysis at temperatures between 550 and 800° C. in the presence of a reducing gas at a ratio of reducing gas/material of 0.20-0.45:1. The pyrolysis products are then separated and the solid residues are unloaded. Once pyrolysis is completed, steam superheated to temperatures between 250 and 300° C. is added in amounts between 0.03-0.12:1 relative to the loaded material. The reducing gas is produced by incomplete combustion of hydrocarbons a=0.4-0.85.

However, this method has several disadvantages. In fact, it is accompanied by high consumption of energy, especially because of the need to produce reducing gas by incomplete combustion of hydrocarbons. Environmentally harmful gases are emitted at the end of the incomplete combustion of these hydrocarbons. Soot of relatively low quality is produced compared with the large amount of ash (8-14 mass %), and in addition that soot is not eliminated as part of this method. For this reason, additional purification of the soot from the ash is necessary, resulting in additional energy costs.

A method for producing carbon black, hydrocarbon fuel components, and raw materials for the chemical industry from industrial and household waste containing rubber is described in patent RU 2352600. This method consists of thermolysis of crumb rubber fluidized in a vertical stream of solvent, liquefying the mixture containing alkyl aromatic hydrocarbons. The solvent circulates between the crumb rubber and the carbon black. The thermolysis products are separated from the carbon black. The thermolysis is carried out at temperatures between 320 and 420° C., with pressures between 3.8 and 4.2 MPa, and in proportions of the mass of solvent to crumb rubber that are greater than or equal to 1.0. In this method, the solvent is both a liquefying agent and a heat transfer agent, carrying away all thermolysis products in the general stream from the reactor. The carbon black that is produced has a composition close to the composition of the soot used in rubber production.

This method also has disadvantages. High energy consumption is associated with creating the fluidized layer by pumping the heat transfer agent-solvent through the crumb rubber and carbon black, and with regeneration of the heat transfer agent-solvent, involving separation of the latter from the waste thermolysis products. Significant amounts of fumes are emitted into the environment. The relatively low quality of the carbon black produced is similar to the soot used in the production of rubber but cannot be considered a complete substitute, since it contains a large amount of ash in the form of zinc oxide, iron oxide, silicon oxide, etc.

Another method of soot production is described in patent RU 747868. This method consists of pyrolysis of solid hydrocarbon raw materials (waste polymer compositions) at temperatures between 400 and 1500° C., with formation of carbon residues, release of gas-vapor products, and crushing of carbon residues in the stream of gas-vapor products at temperatures between 350 and 400° C., pyrolysis of the waste being carried out by the gas-vapor mixture which is composed of (vol. %):

| | |
|---|---|
| Superheated steam | 35-50 |
| Carbon dioxide | 5-10 |
| Carbon monoxide | 1-3 |
| Oxygen | 0.1-2.0 |
| Nitrogen | the remainder |

The gas-vapor products from pyrolysis of waste undergo thermal decomposition at temperatures between 1400 and 1500° C.

The disadvantages associated with this method are high energy consumption, resulting in particular from the high temperatures used during pyrolysis (up to 1500° C.). Significant amounts of environmentally harmful gases are emitted due to thermal decomposition of the gas-vapor products. The soot produced is of relatively low quality, due to the large amount of impurities in the form of ash.

Another method is described in patent RU 2276170. This last method includes thermal decomposition of waste in a reactor in a gas-vapor medium, separation of the decomposition products into gas-vapor products and solid carbon residue, and crushing of the carbon residues.

The oil is extracted from the gas-vapor products by condensation and then undergoes thermal decomposition into soot and gas at temperatures of 900-2000° C. After the oil is released, the gas-vapor products are burned together with the carbon residues, and the soot is obtained by filtration of the combustion products.

After separation of the oil, the combustion of the gas-vapor products together with the crushed carbon residues is carried out with an excess air coefficient of between 0.4 and 0.9, yielding the lower quality of soot, or carbon black, that results from the significant carbon dioxide losses associated with high oxygen levels during combustion.

Beforehand, prior to crushing the carbon residues, metal is extracted from the carbon residues by magnetic separation.

The gases from the thermal decomposition of the oil are burned and the combustion products are used as a heat transfer agent for heating the outside of the reactor.

The disadvantages associated with this method again lie in the high energy consumption to produce 1 kg of soot and the large amount of carbon residues burned without soot formation during the common combustion with the gas-vapor products; the complexity in feeding waste into the reactor due to the need to extract oil from the gas-vapor products using special equipment; the significant emission of harmful combustion products into the environment, caused by the large amount of material burned (gases from the thermal decomposition of the oil, the gas-vapor products, a portion of the crushed carbon residues); and the relatively poor quality of the carbon black produced after combustion of a portion of the crushed carbon residues, since the proportion of carbon in the soot that forms is lower and the ash content is higher.

BRIEF SUMMARY

Embodiments of the present invention aim to overcome disadvantages of the prior art, particularly by reducing the consumption of energy to produce carbon black and by simplifying the feeding of waste into the reactor. Embodiments of the present invention also aim to reduce the amount of harmful emissions into the environment and to improve the quality of the carbon black produced from rubber waste, by reducing the residual ash level present in the carbon black and also by reducing the residue of toxic minerals such as sulfur, silica, and zinc oxide.

To this end, one or more embodiments of the present invention provide a method for producing carbon black from waste rubber, including thermal decomposition thereof in a reactor, separation of the decomposition products into gas-vapor products and solid carbon residues, crushing of the carbon residues, combustion of the gas-vapor products with the crushed carbon residues by supplying the gas-vapor products into the combustion chamber, the mass consumption ratio of the gas-vapor products and crushed carbon residues being between 1:(0.1-2).

Advantageously, during the method for producing carbon black according to one or more embodiments of the present invention, the gas-vapor products are burned with the crushed carbon residues in gaseous form or in liquid form after condensation.

The gas-vapor products that form during thermal decomposition of waste rubber contain hydrocarbons and water vapor. The specific heat from combustion of the gas-vapor products varies with the water vapor content with limit values of 15000 and 40000 kJ/kg. These products are therefore combustible gases.

The combustion of these products with shortage of air leads to the formation of better quality carbon black, sometimes called soot as a misnomer. The presence of water vapor improves the quality characteristics of the soot by increasing the specific surface area resulting from the reaction between the water vapor and the carbon black (or soot) that forms. Thus, during combustion of the gas-vapor products, there is activation of the soot that forms.

Supplying the crushed carbon residues to the combustion chamber by means of gas-vapor products eliminates residues from sulfides and volatile products (resin compounds formed during the thermal decomposition of waste rubber, which accumulate in solid residues). Calcination of the carbon particles leads to the cracking and crushing of said particles. This phenomenon leads to separation of the ash from the carbon (destruction of the carbon-ash conglomerates). This enables the next step of enriching the carbon residues by removing the released ash, that is to say, reducing the ash content and improving the quality of the carbon black produced according to aspects of the present invention.

The carbon residue particles pass into the combustion chamber under the effect of the gas-vapor products and are exposed to a temperature greater than 1000° C. This rapid and high heat causes reactions between the water vapor from the gas-vapor products and the carbon residue particles, with formation of hydrogen and carbon monoxide as well as an increase in the specific surface area of the carbon black.

The crushed carbon residues can be supplied to the combustion chamber under the effect of the gas-vapor products within certain limits. Supplying carbon residues in an amount less than 0.1 kg per 1 kg of burned gas-vapor products (mass ratio less than 1:0.1) causes a sudden reduction in the amount of carbon black that is formed. Supplying carbon residue to the combustion chamber in an amount greater than 2 kg per 1 kg of burned gas-vapor products (mass ratio greater than 1:2) causes deposition of the crushed carbon particles in the combustion chamber, sudden reduction of the temperature in the chamber (the carbon particles are added to the chamber with a temperature below 400° C.), and reduction of the combustion reaction, thus resulting in a drop in production and in the quality of the carbon black that forms.

In a preferred embodiment of the invention, the gas-vapor products condensed in liquid form are separated into a first fraction having a boiling point less than or equal to 360° C. and a second fraction having a boiling point greater than 360° C., the first fraction being mixed with the crushed carbon residues in a ratio of 1:(0.1-2.0), the resulting mixture being burned, the combustion products being separated mechanically in a centrifugal force field into soot and ash.

Separating the oil into a first fraction with a boiling point less than or equal to 360° C. yields a low viscosity liquid, which ensures that the particles of the crushed carbon fraction are impregnated with that liquid by filling the pores of said particles. Impregnation of the carbon residue particles with the oil directly separated from the gas-vapor products is not possible, as this oil has a high viscosity and is unable to substantially penetrate the pores of the particles.

Separating the oil into a second fraction with a boiling point greater than 360° C. produces raw materials of the quality needed to produce carbon black, this fraction having a ratio of hydrogen to carbon that is optimal for producing a yield of high quality carbon black during the thermal decomposition of this fraction.

The thermal decomposition of the oil directly separated from the gas-vapor products does not produce a high yield of quality carbon black, this fraction containing hydrogen and carbon in amounts such that the ratio of hydrogen to carbon is not optimal for producing carbon black.

Mixing the first fraction with the crushed carbon residues produces a combustible suspension containing a free liquid fraction and carbon residue particles regularly distributed within the volume of that fraction. In this way, the carbon residue particles are impregnated with the first liquid fraction, and the pores of the carbon particles are filled with the liquid fraction.

During combustion of this suspension, the free liquid fraction burns first, resulting in the formation of a flame of hot combustion products. The carbon particles are heated by the radiation from the hot flame, which causes evaporation of the liquid fraction contained in the pores of the particles. The liquid fraction pairs that form in the pore channels of the volume of particles due to the influence of a pressure gradient (the evaporation of the liquid fraction within the carbon residue particles results in a pressure increase) pass to the surface of the particles, mix with the air supplied for combustion of the suspension, and burn.

The combustion of vapors on the surface of the particles prevents combustion of the carbon in the particles. This phenomenon preserves the black carbon, which in this case is the desired product, i.e., carbon black. Simultaneously, due to the phenomenon of the pressure increase within the carbon residue particles, these are destroyed by fragmentation into finer particles, resulting in additional crushing of the carbon residues. After this additional crushing, the carbon particles are separated from the ash particles. It is known that during the process of waste rubber pyrolysis, a part of the ashes (zinc oxide, silicon oxide, iron oxide, etc.) forms conglomerates (mechanical compositions) with the pure carbon particles.

To achieve mechanical destruction of these conglomerates (separation of the carbon particles from the ash) there must be sufficiently fine crushing of the carbon residues, resulting in high energy consumption. However, mechanical destruction of the ash and carbon conglomerates is necessary for the subsequent complete separation of the carbon residues into pure carbon and ash.

This separation can be accomplished by mechanical methods, that is to say, by a separation means, as the density of the ash particles is considerably greater than the density of the carbon particles; for example, the density of zinc oxide is 5700 kg/m$^3$, and the density of carbon is 2265 kg/m$^3$.

To produce the combustible suspension, the first fraction is mixed with the crushed carbon residues in a proportion (by weight) of 1:0.1, thus 1.1 kg of suspension must contain at least 0.1 kg of carbon residue and 1.0 kg of the first fraction. If there is a lower particle content in the suspension, their uniformity of distribution within the volume is disturbed, which causes irregular combustion of the suspension (the flame will be affected to a greater or lesser extent depending on the amount of free liquid fraction in the suspension that passes through the injector, which is more or less a function of time).

If there is a lower carbon particle content in the suspension, there will be less carbon black, and consumption of the burned liquid fraction will increase, causing increased energy consumption for the production of carbon black and increased emission of combustion products into the environment.

Combustion of a suspension with a proportion (by weight) of liquid fraction to carbon residue particles greater than 1:2 disturbs the combustion process of that suspension due to the low content of free liquid fraction. In this case, the use of a suspension containing more than 2 kg of carbon residue particles per kg of free liquid fraction results in a disturbance of the combustion process, a disturbance of the carbon particle heat treatment process, and a lower quality of carbon black produced. Combustion of such a suspension causes significant wear due to abrasion of the equipment (injectors), and also high carbon combustion.

Advantageously, the second fraction undergoes thermal decomposition into soot and gas at temperatures between 850 to 2100° C.

Thermal decomposition of the second oil fraction is carried out at temperatures between 850 and 2100° C. in embodiments of the present invention. At temperatures below 850° C., the second oil fraction undergoes practically no decomposition with the formation of carbon black. The rise in temperature to over 2100° C. causes decomposition of a large portion of the oil with formation of graphite, resulting in a marked decrease in the formation of quality carbon black.

In a particular embodiment of the invention, the combustion of the mixture of first fraction and carbon residues is carried out with an excess air coefficient between 0.20 and 0.35. The expression "excess air coefficient" here should be understood in relative terms, there being in this case a reduced level of air compared to the normal level (coefficient equal to 1).

During combustion of the suspension, the amount of air that must be supplied is 0.20 to 0.35 relative to the amount theoretically necessary for this suspension, which is determined by special calculation methods taking into account the specific heat capacity of the suspension and the content of combustible elements (hydrogen, carbon, sulfur). This takes into account the fact that almost no carbon is to be burned, since its combustion (oxidation) leads to reducing the yield of carbon black formation and decreasing its quality because of oxidation of the carbon particles.

Reducing the amount of air supplied during combustion of the suspension to values below 0.20 relative to the theoretically necessary amount makes ignition and combustion of the suspension impossible and stops the carbon black production process.

Increasing the amount of air supplied during combustion of the suspension to values greater than 0.35 relative to the theoretically necessary amount results in an increase in the amount of carbon burned, causing a reduction in the formation of carbon black and a decrease in its quality due to oxidation of the surface of the carbon particles, as well as an increase in the amount of heat emitted, which will cause overheating of the suspension combustion system and deterioration of its work capacity.

Preferably, during the method for producing carbon black according to embodiments of the present invention, the carbon residues are crushed to produce particles of sizes between 0.1 and 2.0 mm.

Crushing the carbon residues into particles smaller than 0.10 mm in size is accompanied by increased energy consumption. With such sizes, the particles have a high reactive capacity due to their large specific surface area, causing intense combustion in the combustion chamber and thus a loss of valuable product, i.e., carbon black.

Supplying the turbulent flame with particles greater than 2.0 mm in size prevents them from being heated to high temperatures. This results in incomplete elimination of volatile particles, which means the carbon black produced is of reduced quality. In addition, particles greater than 2 mm in size are heavily deposited in the combustion chamber (falling from the turbulent flame onto the walls of the chamber). This results in deterioration of the combustion process, reduction in the quantity and quality of the carbon black formed, but also obstruction of the combustion chamber (by the deposited particles).

In a particular embodiment of the invention, some or all of the crushed carbon residue is transported into the combustion chamber by means of the gas-vapor products.

All or part of the crushed carbon residues are supplied to the combustion chamber by gas transport via the turbulent burner. This method of supplying carbon residues via the turbulent gas stream does not disturb the hydrodynamic operation of the turbulent combustion flame, as the latter results from the combustion of gas-vapor products using burners mounted tangentially and diametrically opposite in the combustion chamber. If the hydrodynamic balance of the turbulent flame is disturbed, the combustion process is also disturbed, which reduces the amount and quality of the carbon black produced and increases the amount of combustible hydrocarbon products, ultimately resulting in increased energy consumption for the production of carbon black.

Having the turbulent burner mounted at the end of the axis of the gas-vapor product combustion chamber supply the cylindrical furnace has a number of positive effects, including maintaining the proper operation of the turbulent combustion flame, preventing the deposit of carbon particles in the combustion chamber, and more complete elimination of carbon black particles from the combustion chamber in the reaction chamber, contributing to improved properties of the black carbon thus formed.

The use of a portion of the gas-vapor products for gas transport helps prevent premature ignition of the carbon residues (before they are fed to the combustion chamber). The use of any other inert gas for the gas transport of particles and for feeding them into the combustion chamber would disturb the combustion process in the turbulent flame, causing deterioration of the balance of the combustible components. It is not possible to use air for the gas transport due to the carbon particles igniting before they are fed into the combustion chamber (the ignition temperature of carbon in air is close to 150° C.).

Advantageously, the gases from the thermal decomposition of the second fraction and the combustion products of the mixture are burned together with the gas-vapor products, and the thermal energy produced is used for the thermal decomposition of waste rubber in the reactor.

During the thermal decomposition of the second fraction, in addition to soot formation there is the formation of combustible gaseous decomposition products, which must be used in order to prevent their release into the atmosphere. This is why these thermal decomposition gases are burned with the gas-vapor products, which produces additional energy for the thermal decomposition of waste in the reactor. Mixing the gases from thermal decomposition of the second fraction and the gas-vapor products results in reduced toxicity of the thermal decomposition gases due to the reaction between the components of the mixture (gas and gas-vapor products), which increases the safety of the combustion of thermal decomposition gases.

Embodiments of the present invention also relate to a device for producing carbon black from waste rubber, comprising a reactor having an outlet for carbon residues which is consecutively connected to a screw heat exchanger, a magnetic separator, a mill, a conveyor, a hopper with a metering unit, a tube heat exchanger, a turbulent burner mounted at the end of a cylindrical furnace on the axis of a combustion chamber, an outlet for gas-vapor products from the reactor being connected to the burners of the cylindrical furnace mounted tangentially and diametrically opposite in the combustion chamber, said outlet also being consecutively connected to the heat exchanger of the hopper with metering unit and to the turbulent burner.

Connecting the reactor outlet for gas-vapor products directly to the furnace burners, installed tangentially and diametrically opposite in the combustion chamber, prevents cooling of the gas-vapor products and allows supplying them at a high temperature to the burner. This prevents condensation of water vapor and of a portion of the gas-vapor products and prevents deposition of condensates on elements of the device structure (pipes, etc.) before they enter the burner. Deposition of a portion of the gas-vapor products while they are cooling in the pipes or other components of the device would in fact lower the specific combustion heat of the gas-vapor products supplied to the burner, which could disturb the combustion process. Furthermore, deposition of a portion of the gas-vapor products before they are supplied to the burner results in a reduction of the amount of carbon black formed, or in other words a loss of valuable product.

Connecting the reactor outlet for gas-vapor product to the heat exchanger of the hopper and metering unit makes it possible to use a portion of the gas-vapor products to transport the crushed carbon in the burner. In this way, use of the heat exchanger allows heating the crushed carbon residues via the stream of gas-vapor products, preventing their cooling and preventing the condensation of a portion thereof. Condensation of a portion of the gas-vapor products onto the carbon residue particles leads to the deposition of resin components on the particle surfaces and their agglutination, and prevents their transport with the stream of gas-vapor products, due to deposition on the walls of the heat exchanger, which reduces the efficiency of the gas transport system and prevents feeding carbon residue to the turbulent burner.

Connecting the mill to the screw heat exchanger and the magnetic separator to the reactor outlet allows the carbon residues to be crushed under the influence of the screw and allows the carbon residues to cool. This also helps remove the metal from the carbon residues, firstly to prevent malfunction of the mill, but also to avoid feeding fine metal particles to the cylindrical furnace, which would inevitably lead to contaminating the carbon black with metal particles.

BRIEF DESCRIPTION OF THE DRAWING

FIG. 1 shows the layout of a facility that implements a method for producing carbon black from waste rubber according to one or more embodiments of the present invention.

DETAILED DESCRIPTION

The device according to one embodiment of the present invention comprises a hopper 1 equipped with closures 2 and 3, a cylindrical reactor 4 with a motor 5, connected to a screw 6, two outlets 7 and 7' with a rotary closure mechanism 8 connected to the reactor, a fuel tank 9, connected by a regulating valve 10 to a burner 11, a shell 12 mounted on the reactor 4, a fume extractor 13 connected to a stack 14, a steam generator 15, a steam superheater 16, valves 17 and 18, a burner 19, a valve 20, a steam temperature sensor 21, valves 22 and 23 connected to the reactor 4 and to the burners 24 and 25, a furnace 26 with a cylindrical combustion chamber 27, a screw cooler 28 with a motor 29 and a sleeve 30, a temperature sensor 31, a rotary closure 32, a magnetic separator 33, a storage tank 34, a mill 35, a conveyor 36 connected to a hopper 37 with a metering unit 38 and a heat exchanger 39, a flow meter valve 40, a compressor 41, a valve 42, a burner 43, a sleeve 44 of the heat exchanger 39, a turbulent burner 45, a blower 46 with a valve 47, a reaction chamber 48 of the furnace 26, a water tank 49, an injector 50, a temperature sensor 51, a refrigerator 52, a valve 53, a filter 54, a micromill 55, a blower 56 connected to a storage tank 57, a valve 58, a condenser 59, a separator 60, a water filter 61, a valve 62 connected to an evaporator 63, a valve 64 connected to a storage tank 65, a valve 66 connected to a storage tank 67, the mill 35 also being connected to a storage tank 68, a weight-based metering unit 69 connected to a mixer 70, a valve 71 and a metering unit 72, a blender 73, a pump 74, a cylindrical furnace 75, an air consumption sensor 76, a blower 77, a refrigerator 78, a water tank 79, a filter 80, a dust collector 81, a blower 82 connected to a storage tank 83, an ash storage tank 84, valves 85 and 86, a valve 87 connected to a furnace 88, a blower 89, a temperature sensor 90, a refrigerator 91, a filter 92, a micromill 93, a blower 94, a storage tank 95, a valve 96, and a valve 97.

According to one embodiment of the invention, the production of carbon black from waste rubber is as described below.

Crushed waste rubber is added to the hopper 1 equipped with closed closures 2 and 3. After that, the closure 2 is opened such that the waste from the hopper 1 falls down and rests on the closure 3. Then the closure 3 is opened and the portion of waste falls into the cylindrical reactor 4. The closure 3 is then closed. Simultaneously, the screw 6 mounted in the cylindrical reactor 4 is made to rotate by the motor 5. The crushed waste is caught by the screw and advanced in the cylindrical reactor 4 toward the outlet 7 fitted with the rotary closure 8. The time it takes the waste to travel in the cylindrical reactor is regulated by changing the speed at which the screw 6 turns. Simultaneously with initiating the process and advancing the waste, the fuel from the tank 9 is introduced through the regulating valve 10 into the burner 11 and is burned. The combustion products are directed toward the shell 12 of the reactor 4. Passing into the shell 12, the fuel combustion products heat the reactor, cooling down in their turn, and are discharged into the stack 14 by means of the fume extractor 13.

The steam generator 15 supplies steam to the superheater 16 through the valve 17 so that it is brought to a temperature between 600 and 700° C. Fuel from tank 9 is supplied to be burned for this purpose to the burner 19 via valve 18. The combustion products are heated in contact with steam brought to a temperature of 600-700° C., then they cool to a temperature between 200 and 250° C. before being discharged into the stack 14 by means of the fume extractor 13.

The superheated steam from the water superheater 16 is supplied through the valve 20 to the cylindrical reactor 4. The superheat temperature of the steam is controlled according to the temperature sensor 21 readings. The rubber waste travels in the reactor 4 and is heated by contact with the hot walls of the reactor and by convective heat exchange with the steam supplied to the reactor. There is a resulting thermolysis of the waste, with release of gaseous products and solid carbon residues.

The thermal decomposition products mix with the steam, resulting in gas-vapor products. The gas-vapor products are discharged from the reactor 4 through the valves 22 and 23 into the burners 24 and 25 of the furnace 26 and are burned in a reduced-air atmosphere. The combustion of the gas-vapor products in the cylindrical combustion chamber 27 results in the formation of a turbulent flame. Part of the gas-vapor products burns, and another part breaks down and forms carbon black.

The solid carbon residues present in the reactor 4 pass through the outlet 7 fitted with the rotary closure 8 to the screw heat exchanger 28 equipped with the motor 29 where they are cooled to a temperature greater than 100° C. by means of the water flowing in the shell 30. The cooling temperature of the solid carbon residues is controlled according to the temperature sensor 31 readings. As the crushed residues are fed into the stream of gas-vapor products for transport to the burner, the carbon residues cool to a temperature below 100° C. which allows the condensation of steam on the residue particles (present in the gas-vapor products) and the hydrocarbons with a boiling point greater than 100° C.

After cooling, the solid residues are fed via rotary closure 32 into the magnetic separator 33 in order to remove the metal from the carbon residues, after which the metal is stored in tank 34. The thermolysis of waste rubber performed in the screw reactor allows crushing the solid residues due to the action of the screw and allows separating the metal elements, which are then sorted using the magnetic separator.

The carbon residues thus purified of metal elements by the magnetic separator 33 are then fed into the mill 35 where they are crushed into particles of sizes between 0.10 and 2.0 mm. The crushed waste then passes to the conveyor 36 which supplies the hopper 37 equipped with a metering unit 38 and a tube heat exchanger 39.

The flowmeter-valve 40 is opened and a portion of the gas-vapor products from the reactor 4 is fed to the compressor 41, where they are brought to a temperature of between 350 and 400° C. before being injected into the tube heat exchanger 39. Simultaneously, fuel coming from tank 9 via valve 42 is injected and burned in the burner 43. The combustion products are sent to the sleeve 44 of the heat exchanger 39 and then evacuated by the blower 13 into the stack 14.

Simultaneously, the crushed carbon residues coming from the hopper 37 are supplied through the metering unit 38 in a fixed amount, into the heat exchanger 39 where they are mixed with the gas-vapor products supplied by the compressor 41. The crushed carbon residues in the heat exchanger 39 have a maximum temperature of 150° C. Meanwhile the gas-vapor products have a temperature close to 400° C. in the heat exchanger 39. As these two streams are mixed, the temperature of the mixture lowers and the mixture components having a boiling point close to 400° C. may condense onto the carbon particles. That is why, to avoid such condensation, heat energy is provided in the heat exchanger that is transmitted by the fuel combustion products as they pass through the sleeve 44.

The mixture of gas-vapor products and solid residues that forms in the heat exchanger 39 under the action of the compressor 41 passes into the turbulent burner 45, where air from the blower 46 is supplied through the valve 47 into the separate channel of the burner. The mixture passes, in the form of a vortex, through the vortex fin system of the turbulent burner 45 in the combustion chamber 27. Simultaneously, in the combustion chamber 27, air escapes through a separate channel of the burner 45, and is mixed with the mixture composed of solid carbon particles and gas-vapor products, resulting in the formation of the combustion-ready mixture.

This mixture ignites and gives rise to the gas-vapor product combustion process. A turbulent flame forms in the combustion chamber 27 with incomplete combustion of the gas-vapor products provided in the chamber through the burners mounted tangentially and fed with the turbulent burner (mixed with the crushed carbon residue).

To determine the mass ratio of gas-vapor products and crushed carbon residues supplied for combustion within the range of 1:(0.1-2), using the metering unit 38, the fixed amount of crushed carbon residues is provided, determined based on the estimated magnitude of the gas-vapor products supplied to the combustion chamber with the turbulent burner and the burners mounted tangentially in the combustion chamber.

While supplying the gas-vapor products from the reactor 4 to the burners 24 and 25 of the furnace 26 using the flowmeter-valve 40 and the metering unit 38, the flow rate (controlled based on readings from the flowmeter-valves 22 and 23) of the mixture of gas-vapor products and crushed carbon residues is fixed such that the mass ratio corresponds to 1 kg of gas-vapor products for 0.1 kg to 2.0 kg of carbon residue.

At the end of the incomplete combustion of the mixture of gas-vapor products and crushed carbon residue, carbon black and gases form. The stream of carbon black and gases from the incomplete combustion is conveyed from the combustion chamber 27 to the reaction chamber 48, where the carbon particles are heat-treated. Water is sprayed into the reaction chamber 48 from the tank 49 via the injector 50, which cools the stream of carbon black and combustion products to a temperature between 700 and 800° C., which is controlled based on the temperature sensor 51 readings. The stream of carbon black and combustion products is routed from the reaction chamber 48 to the refrigerator 52, where water from the tank 49 is sprayed through the valve 53 to cool the stream of carbon black and combustion products. The stream of carbon black and combustion products is then routed from the refrigerator 54 to the filter 54, where the carbon black is separated and sent to the micromill 55 and crushed before it is sent by pneumatic conveyor to the storage tank 57 by means of the blower 56.

Since the incomplete combustion products contain combustible materials after separation of the carbon black in the filter 54, these products are directed via the valve 58 into the burner 11 where they are burned together with the fuel supplied to the burner from the tank 9, which prevents the release of harmful substances into the environment and helps reduce consumption in the burner 11 of the fuel from the tank 9, resulting in reduced energy consumption by the method for producing carbon black from waste rubber according to aspects of the invention.

Alternatively, the gas-vapor products emptied from the reactor 4 through the valve 85 are directed toward the condenser 59 where, after heat exchange with the cooling water, the gas-vapor products are condensed into condensate containing water and oil. The condensate is then routed to the separator 60 where the water is separated from the oil. The water passes through the filter 61 and is rerouted to the steam generator 15 for steam production. The oil from the separator 60 is transferred to the evaporator 63 through the valve 62, where it is separated into a first fraction with a boiling point less than or equal to 360° C. and a second fraction with a boiling point greater than 360° C. The first fraction coming from the evaporator 63 passes through valve 64 and flows into storage tank 65 while the second fraction passes through valve 66 and flows into storage tank 67.

The solid carbon residues present in the reactor 4 pass through the outlet 7 fitted with the rotary closure 8 to the screw cooler 28 equipped with the motor 29, where they are cooled to room temperature by heat exchange with the water flowing in the shell 30 of the cooler. The cooling temperature of the solid carbon residues is controlled according to the temperature sensor 31 readings. The solid carbon residues coming from the cooler 28 pass through the rotary closure 32 to the magnetic separator 33; inside said separator the metal is removed from the carbon residues before it is stored in the storage tank 34. The carbon residues thus purified of metal elements are sent to the mill 35 where they are crushed before being loaded into the storage tank 68.

The crushed carbon residues coming from the storage tank 68 pass through the weight-based metering unit 69 to be routed in fixed amounts to the mixer 70. Simultaneously, the first fraction coming from the storage tank 65 through the valve 71 is routed in a fixed-weight amount via the metering unit 72 to the mixer 70. Once the mixer is filled with carbon residues and first fraction, this is all mixed by the blender 73. The mixture is then transferred by the pump 74 to the cylindrical furnace 75 where it is burned with an excess air coefficient of between 0.20 and 0.35.

The amount of air supplied to the furnace 75 is controlled based on the air flow sensor 76 readings, by regulating the air flow with the blower 77. The stream of combustion products and carbon black from the furnace 75 is sent to the refrigerator 78, which receives sprayed water from the tank 79 to help reduce the temperature of the combustion products and carbon black. The cooled mixture from the refrigerator 78 passes through the filter 80 and is mechanically separated in a centrifugal force field by a stream of gas circulating in a dust collector 81, releasing the carbon black and ash. The carbon black is transferred by pneumatic conveyer to the storage tank 83 by means of the blower 82, and the ash is discharged from the dust collector 81 into the storage tank 84.

The gases from the carbon black, purified by the filter 80, contain combustible components and are burned via the valve 58 in the burner 11.

The second fraction from the storage tank 67 passes through the valve 87 to the cylindrical furnace 88, where air is simultaneously added by means of the blower 89. The second fraction undergoes thermal decomposition into carbon black and gases at temperatures between 850 and 2100°

C. by means of incomplete combustion (due to insufficient air) in the cylindrical furnace 88. The combustion temperature is controlled based on the temperature sensor 90 readings.

The heat given off during combustion of a portion of the second fraction causes thermal decomposition of the liquid fraction with formation of combustion products and carbon black. The stream of combustion products and carbon black coming from the furnace 88 is emptied into the refrigerator 91, where water from the tank 79 is sprayed, lowering the temperature of the combustion products and carbon black. The cooled mixture from the refrigerator 91 is fed to the filter 92, where carbon black is released from the gaseous stream and fed to the micromill 93. The carbon black is then transferred by pneumatic conveyor to the storage tank 95 by means of the blower 94.

The gases from the carbon black purified by the filter 92 contain combustible components, and are burned in the burner 11 via the valves 96 and 58.

The gas-vapor products formed by mixing water vapor and non-condensed gases from the thermal decomposition of waste rubber, coming from the condenser 59 via the valves 97 and 58, are burned in the burner 11.

Combustion of this mixture helps reduces the formation of harmful nitrogen oxides due to the presence of water vapor in the mixture.

Aspects of the invention are further illustrated by the following examples.

EXAMPLE 1

Waste rubber crushed into particles ranging between 50 and 70 mm in size and weighing 150 kg is added to the hopper 1 equipped with closed closures 2 and 3. After that, the closure 2 is opened and the waste from the hopper 1 falls down and rests on the closure 3. The closure 2 is closed and then the closure 3 is opened and the portion of waste, due to the action of its own weight, starts to enter the cylindrical reactor 4. The closure 3 is then closed. Simultaneously with the motor 5, the screw 6 mounted in the cylindrical reactor 4 is made to rotate. The crushed waste is caught by the screw and advanced in the cylindrical reactor 4 toward the outlet 7 fitted with the rotary closure 8. The time it takes the waste to travel in the cylindrical reactor is regulated by changing the speed at which the screw 6 turns. This time is determined beforehand based on the particle size of the waste and the intensity of the heat exchange in the reactor. We assume that in this case the time the waste remains in the reactor until complete decomposition (release of volatile products) is 20 minutes. The number of turns of the screw 6 is set at 3 rpm. Thus in 20 minutes the screw will turn 60 times and the waste supplied to the inlet of the reactor will be in the form of solid carbon residues at the outlet 7 from the reactor 4.

Simultaneously with the initiation of the process and the advancement of the waste, the fuel from the tank 9 is fed to the burner 11 through the regulating valve 10 at a rate of 40 kg per hr. and is burned. The combustion products are sent to the shell 12 of the reactor 4. Passing through the shell 12, the fuel combustion products heat the reactor, cooling down in their turn, and are discharged into the stack 14 by means of the fume extractor 13.

The steam generator 15 supplies steam to the steam superheater 16 through the valve 17 at a flow rate of 243 kg/hr. so that it is brought to a temperature of 700° C. Fuel from the tank 9 is supplied for this purpose to the burner 19 via the valve 18 at a flow rate of 9 kg/hr. and is burned. The combustion products are fed to the steam superheater 16. In contact with steam from the steam superheater, the combustion products are heated to a temperature of 600° C., and then cool to a temperature between 200 and 250° C. before being discharged into the stack 14 by means of the fume extractor 13.

The superheated steam from the steam superheater 16 is supplied through the valve 20 to the cylindrical reactor 4 at a flow rate of 243 kg/hr. The superheat temperature is controlled according to the temperature sensor 21 readings. The superheated steam thus supplies the heat necessary for the heating and thermal decomposition of the waste directly in the reactor 4. The rubber waste travels in the reactor 4 and is heated by contact with the hot walls of the reactor and by convective heat exchange with the steam supplied to the reactor. There is a resulting thermolysis of the waste, with release of gaseous products and solid carbon residues.

In this case, during the thermal decomposition of waste rubber, there is a formation of 45 mass % decomposition gas and 55 mass % solid carbon residue, containing 8 mass % metal elements (metal wire). Thus, during the thermal decomposition of 150 kg of waste over 20 minutes, reactor productivity will be 450 kg hr., with formation of 203 kg/hr. decomposition gases and 247 kg/hr. solid carbon residue, containing 20 kg of metal and 227 kg of carbonaceous matter.

The decomposition gases are mixed with the water vapor and form gas-vapor products in the amount of 203 kg/hr.+ 243 kg/hr.=446 kg/hr. The specific heat of combustion of such a mixture is 18,000 kJ/kg. This mixture can be burned with no additional fuel.

The gas-vapor products formed at a flow rate of 446 kg/hr. are discharged from the reactor 4 through the valves 22 and 23 into the burners 24 and 25 of the furnace 26 and are burned in a reduced-air atmosphere, i.e., with the amount of air equal to 0.6 relative to the amount theoretically required for complete combustion of this mixture. We assume in this case that the amount of air theoretically required is 10 kg for 1 kg of burned gas-vapor products. Therefore the furnace must be provided an amount of air equal to 2676 kg/hr., which is achieved by means of blowers and flowmeters mounted on the burners 24 and 25. After combustion of the gas-vapor products in the cylindrical chamber 27, a turbulent flame forms. Part of the gas-vapor products burns, and another part thermally breaks down and forms carbon black.

The solid carbon residues present in the reactor 4 pass through the outlet 7 fitted with the rotary closure 8 to the screw heat exchanger 28 equipped with the motor 29 at a flow rate of 247 kg/hr., and are cooled to a temperature of 120° C. via heat exchange by means of the water flowing in the shell 30 of the cooler. The cooling temperature of the solid carbon residues is controlled according to the temperature sensor 31 readings.

As the crushed residues are fed into the stream of gas-vapor products for transport to the burner, the carbon residues cool to a temperature below 100° C. which allows the condensation of water vapor on the residue particles (present in the gas-vapor products) and the hydrocarbons with a boiling point greater than 100° C.

After cooling, the solid residues are fed via the rotary closure 32 into the magnetic separator 33 in order to remove the metal from the carbon residues at a flow rate of 20 kg/hr., after which the metal is stored in the tank 34. The thermolysis of waste rubber performed in the screw reactor allows crushing the solid residues due to the action of the screw and separating the metal elements, which are then sorted using the magnetic separator.

The carbon residues accordingly purified of metal elements at a flow rate of 227 kg/hr. in the magnetic separator 33 are then fed into the mill 35 where they are crushed into particles 0.25 mm in size. The crushed waste then passes to the conveyor 36 which supplies the hopper 37 equipped with a metering unit 38 and a tube heat exchanger 39.

The flowmeter-valve 40 is opened and a portion of the gas-vapor products from the reactor 4 is fed to the compressor 41 at a flow rate of 200 kg/hr.

Simultaneously, via the valves 22 and 23, the supply of the gas-vapor products to the burners 24 and 25 is reduced to a flow rate of 246 kg/hr. Using the system for regulating the air supply to the burners, the intake of air is reduced to a flow rate of 1476 kg/hr. to maintain an amount of air equal to 0.6 relative to the amount theoretically required. The gas-vapor products are supplied to the tube heat exchanger 39 through the compressor 41 at a flow rate of 200 kg/hr. and at a temperature of 350° C.

Simultaneously, fuel coming from the tank 9 via the valve 42 is injected and burned at a flow rate of 2 kg/hr. in the burner 43. The combustion products are sent to the sleeve 44 of the heat exchanger 39 and then evacuated by the blower 13 into the stack 14 at a flow rate of 24 kg/hr.

Simultaneously, the crushed carbon residues coming from the hopper 37 are supplied through the metering unit 38 at a flow rate of 44.6 kg/hr. into the heat exchanger 39, where they are mixed with the gas-vapor products supplied by the compressor 41. The gas-vapor products and the solid residues are thus mixed. The crushed carbon residues coming from the hopper 37 have a maximum temperature of 120° C. in the heat exchanger 39. Meanwhile the gas-vapor products have a temperature close to 350° C. in the heat exchanger 39. As these two streams are mixed, the temperature of the mixture falls and the mixture components having a boiling point below 350° C. may condense onto the carbon particles. That is why, to avoid such condensation, heat energy is provided in the heat exchanger that is transmitted by the fuel combustion products as they pass through the sleeve 44.

The gas-vapor products are routed into the furnace 26 at a flow rate of 446 kg/hr. Therefore to obtain a mass correlation of 1:0.1 between the gas-vapor products and the crushed carbon residue according to aspects of the present invention, the furnace must be supplied with carbon residues at a flow rate of 44.6 kg, which is achieved by regulating the supply value using the metering unit 38.

The mixture of gas-vapor products and solid residue particles that forms in the heat exchanger 39, due to the action of the compressor 41 at a flow rate of 244.6 kg/hr., passes into the turbulent burner 45 where air from the blower 46 is supplied through the valve 47 into the separate channel of the burner.

To set the amount of supplied air to 0.6 relative to the theoretically required amount of air, the air is supplied at a flow rate of (200 kg/hr.×10 kg/kg)×0.6=1200 kg/hr. by means of the blower 46 and the valve 47 in a separate channel of the burner 45.

The mixture of gas-vapor products and crushed carbon residues passes at a flow rate of 244.6 kg/hr. through the vortex fin system of the turbulent burner 45 in the combustion chamber 27. Simultaneously, in the combustion chamber 27, air passes through a separate channel of the burner 45 at a flow rate of 1200 kg/hr., and is mixed with the mixture composed of solid carbon particles and gas-vapor products, resulting in the formation of the combustion-ready mixture.

This mixture ignites and gives rise to the gas-vapor product combustion process. A turbulent flame forms in the combustion chamber 27 with incomplete combustion of the gas-vapor products supplied to the chamber through burners mounted tangentially and supplied with the turbulent burner (mixed with the crushed carbon residue).

The incomplete combustion of the mixture of gas-vapor products and crushed carbon residue results in the formation of carbon black and gases.

In this case, the carbon black is formed after incomplete combustion of gas-vapor products (in the amount of 140 kg/hr.), but also after heat treatment of the crushed solid carbon residues (in the amount of 40 kg/hr, and 4.6 kg of carbon residues burned in the furnace 26). Thus the carbon black is formed in the amount of 140 kg/hr.+40 kg/hr.=180 kg/hr. at a flow rate of 450 kg/hr. of waste rubber.

The stream of carbon black at a flow rate of 180 kg/hr., and gases from incomplete combustion at a flow rate of 3026.6 kg/hr., are conveyed from the combustion chamber 27 into the reaction chamber 48, where the process of heat treating the carbon particles takes place. Water is sprayed into the reaction chamber 48 from the tank 49 via the injector 50, cooling the stream of carbon black and combustion products to a temperature of 700° C. which is controlled based on the temperature sensor 51 readings. The stream of carbon black and combustion products is routed from the reaction chamber 48 into the refrigerator 52, where water from the tank 49 is sprayed through the valve 53 to cool the stream of carbon black and combustion products to a temperature of 110° C. Cooling to a temperature of 110° C. is necessary to prevent condensation of the water vapor included in the composition of the incomplete combustion gases. The formation of condensate (during condensation of the water vapor) in the refrigerator 52 leads to deposition of a mixture of water-carbon black, i.e., to the loss of valuable product (carbon black), and has effects on the refrigerator 52. The stream of carbon black and combustion products is then routed from the refrigerator 52 to the filter 54, where the carbon black is separated and sent to the micromill 55 and crushed before it is sent by pneumatic conveyor to the storage tank 57 by means of the blower 56 at a flow rate of 180 kg/hr.

Since the incomplete combustion products contain combustible materials after separation of the carbon black in the filter 54, these products are directed via the valve 58 at a flow rate of 3026.6 kg/hr. into the burner 11 where they are burned together with the fuel supplied to the burner from the tank 9, which prevents the release of harmful substances into the environment and helps reduce consumption in the burner 11 of the fuel from the tank 9, which results in reduced energy consumption of the method for producing carbon black from waste rubber according to aspects of the present invention.

The specific heat of combustion of the incomplete combustion products is, in this case, 500 kJ/kg, and the combustion of 3026.6 kg/hr. of these products is equivalent to the combustion of 37 kg/hr. of liquid fuel, which is why the fuel supply to the burner 11 from the tank 9 is reduced via the regulating valve 10 from 40 kg/hr. to 3 kg/hr.

EXAMPLE 2

Waste rubber crushed into particles ranging between 50 and 70 mm in size and weighing 200 kg is added to the hopper 1 equipped with closed closures 2 and 3. After that, the closure 2 is opened and the waste from the hopper 1 falls down and rests on the closure 3. The closure 2 is closed and then the closure 3 is opened and the waste portion starts to enter the cylindrical reactor 4 due to the action of its own weight. The closure 3 is then closed. Simultaneously with the motor 5, the screw 6 mounted in the cylindrical reactor 4 is made to rotate. The crushed waste is caught by the screw and advanced in the cylindrical reactor 4 toward the outlet 7 fitted with the rotary closure 8. The time it takes the waste to travel in the cylindrical reactor is regulated by changing the speed at which the screw 6 turns. This time is determined beforehand based on the particle size of the waste and the intensity of the heat exchange in the reactor. We assume that in this case the time the waste remains in the reactor until complete decomposition (release of volatile products) is 20 minutes. The number of turns of the screw 6 is set at 4 rpm. Thus in 20 minutes the screw will turn 80 times and the waste supplied to the inlet of the reactor will be in the form of solid carbon residues at the outlet 7 from the reactor 4.

Simultaneously with the initiation of the process and the advancement of the waste, the fuel from the tank 9 is fed to the burner 11 through the regulating valve 10 at a rate of 65 kg per hr. and is burned. The combustion products are sent to the shell 12 of the reactor 4. Passing through the shell 12, the fuel combustion products heat the reactor, cooling down in their turn, and are discharged into the stack 14 by means of the fume extractor.

The steam generator 15 supplies steam to the steam superheater 16 through the valve 17 at a flow rate of 65 kg/hr. so that it is brought to a temperature of 600° C. Fuel from the tank 9 is supplied for this purpose to the burner 19 via the valve 18 at a flow rate of 8 kg/hr. and is burned. The combustion products are supplied to the steam superheater 16. In contact with steam from the steam superheater, the combustion products are heated to a temperature of 600° C., and then cool to a temperature between 200 and 250° C. before being discharged into the stack 14 by means of the fume extractor 13.

The superheated steam from the steam superheater 16 is supplied through the valve 20 to the cylindrical reactor 4 at a flow rate of 65 kg/hr. The superheat temperature is controlled according to the temperature sensor 21 readings. The superheated steam thus supplies the heat necessary for the heating and thermal decomposition of the waste directly in the reactor 4. The rubber waste travels in the reactor 4 and is heated by contact with the hot walls of the reactor and by convective heat exchange with the steam supplied to the reactor. There is a resulting thermolysis of the waste, with release of gaseous products and solid carbon residues.

In this case, during the thermal decomposition of waste rubber, there is a formation of 25 mass % decomposition gas and 75 mass % solid carbon residue. Thus, during the thermal decomposition of 200 kg of waste over 20 minutes, reactor productivity will be 600 kg hr., with formation of 150 kg/hr. decomposition gases and 450 kg/hr. solid carbon residue, containing 20 kg of metal and 430 kg of carbonaceous matter.

The decomposition gases are mixed with the water vapor and form gas-vapor products in the amount of 150 kg/hr.+65 kg/hr.=215 kg/hr. The specific heat of combustion of such a mixture is 21,000 kJ/kg. This mixture can be burned with no additional fuel.

The gas-vapor products formed at a rate of 215 kg/hr. are discharged from the reactor 4 through the valves 22 and 23 into the burners 24 and 25 of the furnace 26 and are burned in a reduced-air atmosphere, i.e., with the amount of air equal to 0.7 relative to the amount theoretically required for complete combustion of this mixture. We assume in this case that the amount of air theoretically required is 11 kg for 1 kg of burned gas-vapor products. Therefore the furnace must be provided an amount of air equal to 1,656 kg/hr., which is achieved by means of blowers and flowmeters mounted on the burners 24 and 25. After combustion of the gas-vapor products in the cylindrical chamber 27, a turbulent flame forms. Part of the gas-vapor products burns, and another part thermally breaks down and forms carbon black.

The solid carbon residues present in the reactor 4 pass through the outlet 7 fitted with the rotary closure 8 to the screw heat exchanger 28 equipped with the motor 29 at a flow rate of 450 kg/hr., and are cooled to a temperature of 120° C. via heat exchange by means of the water flowing in the shell 30 of the cooler. The cooling temperature of the solid carbon residues is controlled according to the temperature sensor 31 readings.

As the crushed residues are fed into the stream of gas-vapor products for transport to the burner, the carbon residues cool to a temperature below 100° C. which allows the condensation of water vapor on the residue particles (present in the gas-vapor products) and the hydrocarbons with a boiling point greater than 100° C.

After cooling, the solid residues are fed via the rotary closure 32 into the magnetic separator 33 in order to remove the metal from the carbon residues at a flow rate of 20 kg/hr., after which the metal is stored in the tank 34. The thermolysis of waste rubber performed in the screw reactor allows crushing the solid residues due to the action of the screw and allows separating the metal elements, which are then sorted using the magnetic separator.

The carbon residues thus purified of metal elements at a flow rate of 430 kg/hr. in the magnetic separator 33 are then fed into the mill 35 where they are crushed into particles 2.0 mm in size. The crushed waste then passes to the conveyor 36 which supplies the hopper 37 equipped with a metering unit 38 and a tube heat exchanger 39.

The flowmeter-valve 40 is opened and a portion of the gas-vapor products from the reactor 4 is fed to the compressor 41 at a flow rate of 200 kg/hr.

Simultaneously, via the valves 22 and 23, the supply of the gas-vapor products to the burners 24 and 25 is reduced to a flow rate of 15 kg/hr. Using the system for regulating the air supply to the burners, the intake of air is reduced to a flow rate of 116 kg/hr. to maintain an amount of air equal to 0.7 relative to the theoretically required amount. The gas-vapor products are supplied to the tube heat exchanger 39 through the compressor 41 at a flow rate of 200 kg/hr. and at a temperature of 400° C.

Simultaneously, fuel coming from the tank 9 via the valve 42 is injected and burned at a flow rate of 2 kg/hr. in the burner 43. The combustion products are sent to the sleeve 44 of the heat exchanger 39 and then evacuated by the blower 13 into the stack 14 at a flow rate of 240 kg/hr.

Simultaneously, the crushed carbon residues coming from the hopper 37 are supplied through the metering unit 38 at a flow rate of 430 kg/hr. into the heat exchanger 39, where they are mixed with the gas-vapor products supplied by the compressor 41. The gas-vapor products and the solid residues are thus mixed. The crushed carbon residues coming from the hopper 37 have a maximum temperature of 120° C. in the heat exchanger 39. Meanwhile the gas-vapor products have a temperature close to 400° C. in the heat exchanger 39. As these two streams are mixed, the temperature of the mixture falls and the mixture components having a boiling point below 400° C. may condense onto the carbon particles. That is why, to avoid such condensation, heat energy is provided in the heat exchanger that is transmitted by the fuel combustion products as they pass through the sleeve 44.

The gas-vapor products are routed into the furnace 26 at a flow rate of 215 kg/hr. Therefore to obtain a mass correlation of 1:2.0 between the gas-vapor products and the crushed carbon residue according to aspects of the present invention, the furnace must be supplied with carbon residues at a flow rate of 430 kg, which is achieved by regulating the supply value using the metering unit 38.

The mixture of gas-vapor products and solid residue particles that forms in the heat exchanger 39, due to the action of the compressor 41 at a flow rate of 630 kg/hr., passes into the turbulent burner 45 where air from the blower 46 is supplied through the valve 47 into the separate channel of the burner.

To set the amount of supplied air to 0.7 relative to the theoretically required amount of air, the air is supplied at a flow rate of (200 kg/hr.×11 kg/kg)×0.7=1,540 kg/hr. by means of the blower 46 and the valve 47 in a separate channel of the burner 45.

The mixture of gas-vapor products and crushed carbon residues passes at a flow rate of 630 kg/hr. through the vortex fin system of the turbulent burner 45 in the combustion chamber 27. Simultaneously, in the combustion chamber 27, air passes through a separate channel of the burner 45 at a flow rate of 1,540 kg/hr., and is mixed with the mixture composed of solid carbon particles and gas-vapor products, resulting in the formation of the combustion-ready mixture.

This mixture ignites and gives rise to the gas-vapor product combustion process. A turbulent flame forms in the combustion chamber 27 with incomplete combustion of the gas-vapor products provided in the chamber through the burners mounted tangentially and fed with the turbulent burner (mixed with the crushed carbon residue).

The incomplete combustion of the mixture of gas-vapor products and crushed carbon residue results in the formation of carbon black and gases.

In this case, the carbon black is formed after incomplete combustion of gas-vapor products in the amount of 65 kg/hr., but also after heat treatment of the crushed solid carbon residues in the amount of 390 kg/hr. (40 kg/hr. of carbon residues burned in the furnace 26). Thus the carbon black is formed in the amount of 65 kg/hr.+390 kg/hr.=455 kg/hr. at a flow rate of 600 kg/hr. of waste rubber.

The stream of carbon black at a flow rate of 455 kg/hr., and gases from incomplete combustion at a flow rate of 1,911 kg/hr. are conveyed from the combustion chamber 27 into the reaction chamber 48, where the process of heat treating the carbon particles takes place. Water is sprayed into the reaction chamber 48 from the tank 49 via the injector 50, cooling the stream of carbon black and combustion products to a temperature of 700° C. which is controlled based on the temperature sensor 51 readings. The stream of carbon black and combustion products is routed from the reaction chamber 48 into the refrigerator 52, where the water from the tank 49 is sprayed through the valve 53 to cool the stream of carbon black and combustion products to a temperature of 110° C. Cooling to a temperature of 110° C. is necessary to prevent condensation of the water vapor included in the composition of the incomplete combustion gases. The formation of condensate (during condensation of the water vapor) in the refrigerator 52 leads to deposition of a mixture of water-carbon black, i.e., to the loss of valuable product (carbon black), and has effects on the refrigerator 52. The stream of carbon black and combustion products is then routed from the refrigerator 52 to the filter 54, where the carbon black is separated and sent to the micromill 55 and crushed before it is sent by pneumatic conveyor to the storage tank 57 by means of the blower 56 at a flow rate of 180 kg/hr.

Since the incomplete combustion products contain combustible materials after separation of the carbon black in the filter 54, these products are directed via the valve 58 at a flow rate of 1,911 kg/hr. into the burner 11 where they are burned together with the fuel supplied to the burner from the tank 9, which prevents the release of harmful substances into the environment and helps reduce consumption in the burner 11 of the fuel from the tank 9, which results in reduced energy consumption of the method for producing carbon black from waste rubber according to aspects of the present invention.

The specific heat of combustion of the incomplete combustion products is, in this case, 1000 kJ/kg, and the combustion of 1,911 kg/hr. of these products is equivalent to the combustion of 48 kg/hr. of liquid fuel, which is why the fuel supply to the burner 11 from the tank 9 is reduced via the regulating valve 10 from 65 kg/hr. to 17 kg/hr.

The mixture undergoing common combustion contains the products from the incomplete combustion of the mixture (gas-vapor products and crushed carbon residues), the thermal decomposition gases from the waste rubber, and water vapor. During combustion of such a mixture, releases of nitrogen oxides are reduced due to the presence of water vapor, which reduces releases to the environment when utilizing the method for producing carbon black from waste rubber according to aspects of the present invention.

EXAMPLE 3

Waste rubber crushed into particles ranging between 50 and 70 mm in size and weighing 300 kg is added to the hopper 1 equipped with closed closures 2 and 3. After the hopper 1 is filled, the closure 2 is opened and the waste from the hopper 1 falls down and rests on the closure 3. After that, the closure 2 is closed and the closure 1 is opened, and the waste falls into the cylindrical reactor 4. Then the closure 3 is closed and the hopper 1 is supplied with a new portion of waste in the amount of 300 kg. Waste is periodically loaded into the hopper 1 in amounts of 300 kg, at a frequency of 3 times per hour. This method of adding waste to the reactor helps decrease the amount of air that enters the reactor with the waste, in comparison to a continuous method. There is a risk of explosion when large amounts of air enter the reactor.

Simultaneously, the screw 6 mounted in the cylindrical reactor 4 is made to rotate by the motor 5. The crushed waste is caught by the screw and advanced in the cylindrical reactor 4 toward the outlet 7 fitted with the rotary closure 8. The time it takes the waste to travel in the cylindrical reactor is regulated by changing the rotation speed of the screw 6 such that waste traverses the screw in 20 minutes (time required for complete thermal decomposition of the waste) and reaches the outlet 7 fitted with the rotary closure 8. In this example, the rotation speed of the screw is 120 revolutions per hour (2.0 rpm).

Simultaneously with the initiation of the process and the advancement of the waste, the fuel from the tank 9 is fed to the burner 11 through the regulating valve 10 at a rate of 80 kg per hr. and is burned. The combustion products are sent to the shell 12 of the reactor 4 at a temperature of 1000° C. and in the amount of 960 kg/hr. (combustion of 1 kg of fuel results in the formation of 12 kg of combustion products). Passing through the shell 12, the fuel combustion products heat the reactor, cooling down in their turn to 200° C., and are discharged into the stack 14 by means of the fume extractor 13.

The amount of heat transmitted through the wall of the reactor from the combustion products to the waste during the 20 minutes corresponds to the following formula:

$$Q\text{pr.comb.} = M\text{pr.comb.} \cdot C\text{pr.comb.} \cdot (T2-T1) = 320 \text{ kg} \times 1.34 \text{ kJ/kg}°\text{ C.}(1000°\text{ C.}-200°\text{ C.}) = 343{,}040 \text{ kJ}$$

where M pr. comb. represents the amount of combustion products, i.e., 320 kg; C pr. comb. represents the specific heat capacity of the combustion products, i.e., 1.34 kJ/kg ° C.; and T1=1000° C. and T2=200° C. represent the temperatures of the combustion products entering and exiting the reactor shell.

The amount of heat required for the thermal decomposition of 300 kg of waste rubber over 20 minutes is determined as follows:

$$Q \text{ tot} = Q\text{heat} + Q\text{decomp.} + Q\text{losses}$$

$$Q \text{ tot} = 1.2\{(Cp \text{ waste } M\text{waste}(T2-T1) + q M\text{waste})\}.$$

$$Q \text{ tot} =$$

$$1.2\{(1.4 \text{ kJ/kg } 300 \text{ kg } (400°\text{ C.}-20°\text{ C.}) + 600 \text{ kJ/kg } 300 \text{ kg})\} = 407{,}520 \text{ kJ}$$

where Qtot represents the total amount of heat required for thermal decomposition of the waste; Qheat represents the heat required to heat the waste to a temperature of 400° C.; Q decomp. represents the heat used for waste decomposition; Qlosses represents the heat losses which make up 20% of the total amount of heat; q represents the specific heat of the decomposition, which for waste rubber represents 600 kJ/kg; Mwaste=300 kg representing the mass of the waste; T1=20° C. and T2=400° C. represent the initial and final temperatures of the waste.

The amount of heat transferred from the combustion products through the reactor wall is thus insufficient for thermal decomposition of the waste, which is why the amount of missing heat 64480 kJ must be provided in the reactor with the superheated steam.

Therefore the consumption of the superheated steam Gstm (Tent=600° C. and Texit=400° C., Cstm=2 kJ/kg ° C.) represents:

$$G\text{stm} = \{(Q\text{tot.}-Q\text{pr.comb.})/(C\text{stm Tent.}-T\text{exit})\}:$$
$$1200 \text{ s} = \{(64{,}480 \text{ kJ})/2 \text{ kJ/kg}°\text{ C.}(600°\text{ C.}-400°\text{ C.})\}:1200 \text{ s} = = 0.1344 \text{ kg/s},(484 \text{ ks/h})$$

where Gstm represents steam consumption, kg/hr.; Cstm represents the specific heat capacity of the steam, or 2 kJ/kg ° C.; Tent., Texit represent the steam temperatures on entering and exiting the reactor (equal to the temperature of the gas-vapor mixture discharged from the reactor).

The steam generator 15 supplies steam to the steam superheater 16 through the valve 17 at a flow rate of 484 kg/hr. up to a temperature of 600° C. Fuel from the tank 9 is supplied for this purpose to the burner 19 at a flow rate of 15 kg/hr. and is burned. The combustion products are supplied to the steam superheater 16. By passing through the steam superheater, the combustion products heat the steam to a temperature of 600° C., and then are cooled to a temperature of 200° C. before being discharged into the stack 14 by means of the fume extractor 13.

The superheated steam from the steam superheater 16 is supplied through the valve 20 to the reactor 4 at a flow rate of 484 kg/hr. The superheat temperature is controlled according to the temperature sensor 20 readings. The superheated steam thus supplies the necessary amount of heat, i.e., 64,480 kJ, directly into the reactor 4 over 20 minutes.

The rubber waste travels in the reactor 4 and is heated by contact with the hot walls of the reactor and by convective heat exchange with the steam supplied to the reactor. There is a resulting thermolysis of the waste, with release of gaseous products and solid carbon residues. The gaseous products of the waste decomposition mix with the water vapor, resulting in the formation of gas-vapor products.

In this case, during the thermal decomposition of waste rubber, there is a formation of 40 mass % decomposition gas and 60 mass % solid carbon residues, containing 10 mass % metal elements. Thus, during the thermal decomposition of 300 kg of waste over 20 minutes, reactor productivity will be 900 kg/hr., with formation of 360 kg/hr. decomposition gases and 540 kg/hr. solid carbon residues, containing 54 kg of metal elements.

The decomposition gases are mixed with the water vapor and form gas-vapor products in the amount of 484 kg/hr.+ 360 kg/hr.=844 kg/hr.

The gas-vapor products formed at a flow rate of 844 kg/hr. are discharged from the reactor 4 through the outlet 7' via the valve 85 into the condenser 59 where, by heat exchange with the cooling water, they condense and form a condensate containing water and oil.

In this example, 80 mass % of gas-vapor products lead to the formation of a condensate containing water and oil. Thus 675 kg/hr. of gas-vapor products are condensed in the condenser 59. The condensate is composed of 454 kg of water and 268 kg of oil. A portion of the water vapor representing 30 kg is not condensed. A portion of the decomposition gases from the waste rubber representing 92 kg/hr. is not condensed either.

The condensate is transferred toward the separator 60 where the water is separated from the oil. An amount of 454 kg/hr. of water passes through the filter 61 and is recycled in the steam generator 15 for use in producing working steam. The oil from the separator 60 is transferred to the evaporator 63 through the valve 62 at a flow rate of 268 kg/hr.; it is then separated into a first fraction having a boiling point less than or equal to 360° C., representing 160 kg, and a second fraction having a boiling point greater than 360° C., representing 108 kg. The first fraction from the evaporator 63 passes through the valve 64 at a flow rate of 60 kg/hr. and is discharged into the storage tank 65, while the second fraction passes through the valve 66 at a flow rate of 108 kg/hr. and is discharged into the storage tank 67.

The solid carbon residues present in the reactor 4 pass through the outlet 7 fitted with the rotary closure 8 at a flow rate of 540 kg/hr. and are discharged into the screw cooler 28 equipped with the motor 29 where they are cooled to a temperature of 20° C. via heat exchange with the water flowing in the shell 30 of the cooler. The cooling temperature of the solid carbon residues is controlled according to the temperature sensor 31 readings.

The solid carbon residues coming from the cooler 28 pass through the rotary closure 32 at a flow rate of 540 kg/hr., to the magnetic separator 33 where 54 kg/hr. of metal is removed before the carbon residues thus purified are stored in the storage tank 34. The carbon residues thus purified of metal elements are then fed to the mill 35 at 486 kg/hr. where they are crushed before being loaded into the storage tank 68.

Crushed carbon residues having particle sizes of 0.2 mm and coming from the storage tank 68 pass through the weight-based metering unit 69 to the mixer, in the amount of 16 kg. Simultaneously, the first fraction coming from the storage tank 65 via the valve 71, in the amount of 160 kg, is routed via the metering unit 72 to the mixer 70. Once the mixer is filled with carbon residues and first fraction, this is all mixed with the blender 73. In this mixture, the proportion of liquid first fraction and crushed carbon residue is 1:0.1 (160 kg:16 kg). The mixture is then transferred by means of the pump 74 at a flow rate of 176 kg/hr. into the cylindrical furnace 75 where it is burned with an excess air coefficient of 0.35.

In this example, the amount of air theoretically required for combustion of 160 kg of first fraction is 2080 kg (13 kg of air for 1 kg of first fraction), and for the combustion of 16 kg of carbon residue, the amount of air theoretically required is 192 kg (12 kg for 1 kg of residue). Thus complete combustion of the mixture requires a necessary amount of air of 2272 kg/hr.

The mixture is burned in the cylindrical furnace 75 with an excess air coefficient of 0.35, i.e., 795 kg/hr. The amount of air supplied to the furnace is controlled based on the air consumption sensor 76 readings in the furnace 75. The air flow is regulated at 795 kg/hr by the blower 77.

The incomplete combustion of the mixture in the cylindrical furnace 75 generates heat causing thermal decomposition of the hydrocarbons in the first fraction. Carbon black is thus produced in a quantity amounting to 25% by mass of the first fraction, i.e., 40 kg/hr., and gases are also produced in a quantity amounting to 37% by mass, i.e., 59 kg/hr. A portion of the first fraction burns, or 38% by mass (61 kg/hr. are burned).

Carbon from the solid residues partially burns in the amount of 1.4 kg/hr., and is partially heated with the discharge of sulfurized compounds from the carbon residues in the amount of 0.1 kg. In that way, the amount of carbon black formed is 40 kg/hr.+16.9 kg/hr.=56.9 kg/hr.

The streams of incomplete combustion products and carbon black coming from the furnace 75 in the amount of 915 kg/hr. and 56.9 kg/hr. respectively, are sent to the refrigerator 78, where the water from the tank 79 is sprayed, lowering the temperature of the combustion products and the carbon black. The cooled mixture from the refrigerator 78 passes through the filter 80 and is mechanically separated in a centrifugal force field by a stream of gas circulating in the dust collector 81, releasing carbon black in the amount of 56.9 kg/hr. and ash in the amount of 0.1 kg/hr.

The carbon black is transferred in the amount of 56.9 kg/hr. by pneumatic conveyer to the storage tank 83 using the blower 82, and the ash is discharged in the amount of 0.1 kg/hr. from the dust collector 81 into the storage tank 84.

The gases from the carbon black, purified by the filter 80, contain combustible components and are burned in the burner 11 via the valve 58 in the amount of 915 kg/hr.

The second fraction from the storage tank 67 passes through the valve 87 into the cylindrical furnace 88 at a flow rate of 108 kg/hr., where air is simultaneously added by means of the blower 89. The second fraction undergoes thermal decomposition into carbon black and gases at a temperature of 850° C. by means of incomplete combustion (due to insufficient air) in the cylindrical furnace 88. The combustion temperature is controlled based on the temperature sensor 90 readings.

The heat given off during combustion of a portion of the second fraction causes thermal decomposition of the liquid fraction with formation of soot and gases (the specific heat of combustion of these gases is 20 MJ/kg). In this example, a portion of the second fraction decomposes with formation of carbon black (32 kg/hr.), a portion of the second fraction burns (22 kg/hr.), and the portion of the second fraction that remains (54 kg) thermally decomposes with formation of combustible gases releasing a heat of combustion of 20 MJ/kg.

The temperature inside the furnace 88 is controlled based on the sensor 90 readings, and by regulating the addition of air by the blower 89 (the addition of air is increased as the temperature decreases and is decreased as the temperature decreases), with the temperature fixed at 850° C. The stream of combustion products and carbon black from the furnace 88 is discharged at a flow rate of 372 kg/hr. into the refrigerator 91, where water from the tank 79 is sprayed, lowering the temperature of the combustion products and carbon black to T=150° C.

The cooled mixture from the refrigerator 91 is supplied to the filter 92, where the soot is released from the gaseous stream in the amount of 32 kg/hr., then transferred to the micromill 93, and the carbon black is routed by pneumatic conveyor to the storage tank 95 by means of the blower 94.

The gases from the carbon black purified by the filter 92 in the amount of 340 kg/hr. (54 kg of decomposition gas from the fraction and 286 kg/hr. of combustion products, 22 kg/hr. from the second fraction) are burned in the burner 11 via the valves 96 and 58.

Combustion of the gases in the burner makes effective use of the heat of combustion of the gases and prevents their release into the environment. As the heat of combustion of the gases is 3180 kJ/kg, they are burned at a rate of 340 kg/hr. (which is equivalent, based on the heat of combustion, to combustion of 27 kg of fuel with a specific heat of combustion of 40 MJ/kg). The amount of fuel burned in the burner 11 is reduced to 27 kg/hr., and then set at 53 kg/hr.

The gas-vapor products formed by mixing water vapor at 30 kg/hr and 92 kg/hr. of non-condensed gases from the thermal decomposition of waste rubber, coming from the condenser 59 in the amount of 122 kg/hr. via the valves 97 and 58, are burned in the burner 11.

The specific heat of combustion of such a mixture is equal to 17,000 kJ/kg; based on the heat of combustion, the combustion of 122 kg/hr. of this mixture is equivalent to the combustion of 51 kg of fuel with a specific heat of combustion of 40,000 kJ/kg. The amount of fuel burned in the burner 11 is reduced to 51 kg/hr., and then set at 2 kg/hr.

EXAMPLE 4

Waste rubber crushed into particles ranging between 40 and 50 mm in size and weighing 200 kg is added to the hopper 1 equipped with closed closures 2 and 3. After the hopper 1 is filled, the closure 2 is opened and the waste from the hopper 1 falls down and rests on the closure 3. After that, the closure 2 is closed and the closure 1 is opened, and the waste falls into the cylindrical reactor 4. Then the closure 3 is closed and the hopper 1 is supplied with a new portion of waste in the amount of 200 kg. Such a waste addition sequence is necessary to prevent large amounts of air from entering the reactor, which can cause an explosion.

Simultaneously, the screw 6 mounted in the cylindrical reactor 4 is made to rotate by the motor 5. The crushed waste is caught by the screw and advanced in the cylindrical reactor 4 toward the outlet 7 fitted with the rotary closure 8. The time it takes the waste to travel in the cylindrical reactor is regulated by changing the rotation speed of the screw 6 such that waste traverses the screw in 20 minutes (time required for complete thermal decomposition of the waste and for heating the solid residues to 500° C.) and reaches the outlet 7 fitted with the rotary closure 8. In this example, the rotation speed of the screw is 80 revolutions per hour.

Simultaneously with the initiation of the process and the advancement of the waste, the fuel from the tank 9 is fed to the burner 11 through the regulating valve 10 at a rate of 60 kg per hr. and is burned. The combustion products are sent to the shell 12 of the reactor 4 at a temperature of 1000° C. and in the amount of 720 kg/hr. (combustion of 1 kg of fuel results in the formation of 12 kg of combustion products). Passing through the shell 12, the fuel combustion products heat the reactor, cooling down in their turn to 200° C., and are discharged into the stack 14 by means of the fume extractor 13.

The amount of heat transmitted through the wall of the reactor from the combustion products to the waste during the 20 minutes corresponds to the following formula:

$$Q\text{pr.comb.} = M\text{pr.comb } C\text{pr.comb}(T2-T1) = 240 \text{ kg} \times 1.34 \text{ kJ/kg°C.}(1000° \text{C.} - 200° \text{C.}) = 257{,}280 \text{ kJ}$$

where M pr. comb. represents the amount of combustion products, i.e., 240 kg; C pr. comb. represents the specific heat capacity of the combustion products, i.e., 1.34 kJ/kg °C.; and T1=1000° C. and T2=200° C. represent the temperatures of the combustion products entering and exiting the reactor shell.

The amount of heat required for thermal decomposition of 200 kg of waste rubber and for heating solid carbon residues to 500° C. over 20 minutes is determined as follows:

$$Q \text{ tot} = Q\text{heat} + Q\text{decomp.} + Q\text{losses},$$

$$Q \text{ tot} = 1.2\{(Cp \text{ waste } M\text{waste}(T2 - T1) + qM\text{waste})\}.$$

$$Q \text{ tot} =$$

$$1.2\{(1.4 \text{ kJ/kg } 200 \text{ kg } (500° \text{C.} - 20° \text{C.}) + +600 \text{ kJ/kg } 200 \text{ kg})\} = $$

$$305{,}280 \text{ kJ}$$

where Qtot represents the total amount of heat required for thermal decomposition of the waste; Qheat represents the heat required to heat the waste to a temperature of 500° C.; Q decomp. represents the heat used for waste decomposition; Qlosses represents the heat losses which make up 20% of the total amount of heat; q represents the specific heat of the decomposition, which for waste rubber represents 600 kJ/kg; Mwaste=300 kg representing the mass of the waste; T1=20° C. and T2=500° C. represent the initial and final temperatures of the waste.

The amount of heat transferred from the combustion products through the reactor wall is thus insufficient for thermal decomposition of the waste, which is why the amount of missing heat 48000 kJ must be provided in the reactor with the superheated steam.

Therefore the consumption of the superheated steam Gstm (Tent=700° C. and Texit=400° C., Cstm=2 kJ/kg ° C.) represents:

$$G\text{stm} = \{(Q\text{tot} - Q\text{pr.comb.})/(C\text{stm } T\text{entr.} - T\text{exit})\}: 1200 \text{ s} = \{(48{,}000 \text{ kJ})/(2 \text{ kJ/kg°C.}(700° \text{C.} - 500° \text{C.})\}: 1200 \text{ s} = 360 \text{ kg/hr.}$$

where Gstm represents steam consumption, kg/hr.; Cstm represents the specific heat capacity of the steam, or 2 kJ/kg ° C.; Tent., Texit represent the steam temperatures on entering and exiting the reactor (equal to the temperature of the gas-vapor mixture discharged from the reactor).

The steam generator 15 supplies steam to the steam superheater 16 through the valve 17 at a flow rate of 360 kg/hr. up to a temperature of 700° C. Fuel from the tank 9 is supplied for this purpose to the burner 19 at a flow rate of 13 kg/hr. and is burned. The combustion products are fed to the steam superheater 16. By passing through the steam superheater, the combustion products heat the steam to a temperature of 700° C., and then are cooled to a temperature of 200° C. before being discharged into the stack 14 by means of the fume extractor 13.

The superheated steam coming from the steam superheater 16 is supplied through the valve 20 to the reactor 4 at a flow rate of 360 kg/hr. The superheat temperature is controlled according to the temperature sensor 20 readings. The superheated steam thus supplies the necessary amount of heat, i.e., 48000 kJ, directly into the reactor 4 over 20 minutes.

The rubber waste travels in the reactor 4 and is heated by contact with the hot walls of the reactor and by convective heat exchange with the steam supplied to the reactor. There is a resulting thermolysis of the waste, with release of gaseous products and solid carbon residues. The gaseous products of the waste decomposition mix with the water vapor, resulting in the formation of gas-vapor products.

In this case, during the thermal decomposition of waste rubber, there is a formation of 45 mass % decomposition gas and 55 mass % solid carbon residues, containing 10 mass % metal elements. Thus, during the thermal decomposition of 200 kg of waste over 20 minutes, reactor productivity will be 600 kg/hr., with formation of 270 kg/hr. decomposition gases and 330 kg/hr. solid carbon residues, containing 33 kg of metal elements.

The decomposition gases are mixed with the water vapor and form gas-vapor products in the amount of 270 kg/hr.+360 kg/hr.=630 kg/hr.

The gas-vapor products formed at a flow rate of 630 kg/hr. are discharged from the reactor 4 through the outlet 7' via the valve 85 into the condenser 59 where, by heat exchange with the cooling water, they condense and form a condensate containing water and oil.

In this example, 80 mass % of gas-vapor products lead to the formation of a condensate containing water and oil. Thus 59,504 kg/hr. of gas-vapor products are condensed in the condenser 59. The condensate is composed of 340 kg of water and 243 kg of oil. A portion of the water vapor representing 20 kg is not condensed. A portion of the decomposition gases from the waste rubber representing 27 kg/hr. is not condensed either.

The condensate is transferred toward the separator 60 where the water is separated from the oil. An amount of 340 kg/hr. of water passes through the filter 61 and is recycled in the steam generator 15 for use in producing working steam. The oil from the separator 60 is transferred to the evaporator 63 through the valve 62 at a flow rate of 243 kg/hr.; it is then separated into a first fraction having a boiling point less than or equal to 360° C., representing 150 kg, and a second fraction having a boiling point greater than 360° C., representing 93 kg. The first fraction from the evaporator 63 passes through the valve 64 at a flow rate of 150 kg/hr. and is discharged into the storage tank 65, while the second fraction passes through the valve 66 at a flow rate of 93 kg/hr. and is discharged into the storage tank 67.

The solid carbon residues present in the reactor 4 pass through the outlet 7 fitted with the rotary closure 8 at a flow rate of 330 kg/hr. and are discharged into the screw cooler 28 equipped with the motor 29 where they are cooled to a temperature of 20° C. via heat exchange with the water flowing in the shell 30 of the cooler. The cooling temperature of the solid carbon residues is controlled according to the temperature sensor 31 readings.

The solid carbon residues coming from the cooler 28 pass through the rotary closure 32 at a flow rate of 330 kg/hr., to the magnetic separator 33 where 33 kg/hr. of metal is removed before the carbon residues thus purified are stored in the storage tank 24. The carbon residues thus purified of the metal elements are then fed to the mill 35 at 297 kg/hr. where they are crushed into particles 0.2 mm or less in size before being loaded into the storage tank 68.

The crushed carbon residues coming from the storage tank 68 pass through the weight-based metering unit 69 to the mixer 70, in the amount of 290 kg. Simultaneously, the first fraction coming from the storage tank 65 via the valve 71 is routed via the metering unit 72 to the mixer 70, in the amount of 145 kg. Once the mixer is filled with carbon residues and first fraction, this is all mixed with the blender 73. In this mixture, the proportion of liquid first fraction and crushed carbon residue is 1:2 (145 kg:290 kg). The mixture is then transferred by means of the pump 74 at a flow rate of 435 kg/hr. into the cylindrical furnace 75 where it is burned with an excess air coefficient of 0.2.

In this example, the amount of air theoretically required for combustion of 145 kg of first fraction is 1,885 kg (13 kg of air for 1 kg of first fraction), and for the combustion of 290 kg of carbon residue, the amount of air theoretically required is 3,480 kg (12 kg for 1 kg of residue). Thus complete combustion of the mixture requires a necessary amount of air of 5,365 kg/hr.

The mixture is burned in the cylindrical furnace 75 with an excess air coefficient of 0.2, i.e., 1,073 kg/hr. The amount of air supplied to the furnace is controlled based on the air consumption sensor 76 readings in the furnace 75. The air flow is regulated at 1,073 kg/hr by the blower 77.

The incomplete combustion of the mixture in the cylindrical furnace 75 generates heat causing thermal decomposition of the hydrocarbons in the first fraction. Carbon black is thus produced in the amount of 25% by mass of the first fraction, i.e., 36 kg/hr., and gases are also produced in the amount of 25% by mass, i.e., 36 kg/hr. A portion of the first fraction burns, or 50% by mass (72.5 kg/hr. are burned).

Carbon from the solid residues partially burns in the amount of 10 kg/hr., and is partially heated with the discharge of sulfurized compounds from the carbon residues in the amount of 6 kg/hr. In that way, the amount of carbon black formed is 36 kg/hr.+274 kg/hr.=310 kg/hr.

The streams of incomplete combustion products and carbon black coming from the furnace 75 in the amount of 1,198 kg/hr. and 310 kg/hr., respectively, are sent to the refrigerator 78, where the water from the tank 79 is sprayed, lowering the temperature of the combustion products and the carbon black. The cooled mixture from the refrigerator 78 passes through the filter 80 and is mechanically separated in a centrifugal force field by a stream of gas circulating in the dust collector 81, releasing carbon black in the amount of 290 kg/hr. and ash in the amount of 20 kg/hr.

The carbon black is transferred in the amount of 290 kg/hr. by pneumatic conveyer to the storage tank 83 using the blower 82, and the ash is discharged in the amount of 20 kg/hr. from the dust collector 81 into the storage tank 84.

The gases from the carbon black, purified by the filter 80, contain combustible components and are burned in the burner 11 via the valve 58 in the amount of 888 kg/hr.

The second fraction from the storage tank 67 passes through the valve 87 into the cylindrical furnace 88 at a flow rate of 93 kg/hr., where air is simultaneously added by means of the blower 89. The second fraction undergoes thermal decomposition into carbon black and gases at a temperature of 2500° C. by means of incomplete combustion (due to insufficient air) in the cylindrical furnace 88. The combustion temperature is controlled based on the temperature sensor 90 readings.

The heat given off during combustion of a portion of the second fraction causes thermal decomposition of the liquid fraction with formation of soot and gases (the specific heat of combustion of these gases is 20 MJ/kg).

In this example, a portion of the oil decomposes with formation of carbon black (30% by mass of the oil, i.e., 28 kg/hr.), a portion of the oil burns (20% by mass of the oil, i.e., 20 kg/hr.), and the portion of the oil that remains (nearly 50% by mass of the oil, i.e., 45 kg) thermally decomposes with formation of combustible gases releasing a heat of combustion of 20 MJ/kg.

The temperature inside the furnace 88 is controlled based on the sensor 90 readings, and by regulating the addition of air by the blower 89 (the addition of air is increased as the temperature decreases and is decreased as the temperature decreases), with the temperature fixed at 2500° C. The stream of combustion products and carbon black from the furnace 88 is discharged at a flow rate of 333 kg/hr. into the refrigerator 91, where water from the tank 79 is sprayed, lowering the temperature of the combustion products and the carbon black to T=150° C.

The cooled mixture from the refrigerator 91 is supplied to the filter 92, where the soot is released from the gaseous stream in the amount of 28 kg/hr., then transferred to the micromill 93, and the soot is routed by pneumatic conveyor to the storage tank 95 by means of the blower 94.

The gases from the carbon black purified by the filter 92 in the amount of 305 kg/hr. (combustion products 20 kg/hr., oil 260 kg/hr., thermal decomposition gas from the second fraction 45 kg/hr.) are burned in the burner 11 via the valves 96 and 58.

Combustion of the gases in the burner makes effective use of the heat of combustion of the gases and prevents their release into the environment. As the heat of combustion of the gases is 44,000 kJ/kg, they are burned at a rate of 305 kg/hr. (which is equivalent, based on the heat of combustion, to combustion of 33 kg of fuel with a specific heat of combustion of 40 MJ/kg). The amount of fuel burned in the burner 11 is reduced to 44 kg/hr., and then set at 60 kg/hr.−33 kg/hr.)=27 kg/hr.

The gas-vapor products formed by mixing water vapor at 20 kg/hr and 27 kg/hr. of non-condensed gases from the thermal decomposition of waste rubber, coming from the condenser 59 in the amount of 47 kg/hr. via the valves 97 and 58, are burned in the burner 11.

The specific heat of combustion of such a mixture is equal to 17,000 kJ/kg; based on the heat of combustion, the combustion of 47 kg/hr. of this mixture is equivalent to the combustion of 20 kg of fuel with a specific heat of combustion of 40,000 kJ/kg. The amount of fuel burned in the burner 11 is reduced to 20 kg/hr., and then set at 7 kg/hr.

The mixture undergoing common combustion contains thermal decomposition gases from the second fraction, products from the incomplete combustion of the mixture (the first fraction and crushed carbon residue), thermal decomposition gases from the waste rubber, and water vapor. During the combustion of such a mixture, releases of nitrogen oxides are reduced due to the presence of water vapor, which reduces releases to the environment during the course of the method for producing carbon black from waste rubber according to aspects of the present invention.

Using a portion of waste rubber to supply energy to the method for producing carbon black according to embodiments of the present invention results in reduced energy consumption, which, compared with known technologies for producing carbon black, precludes the need for additional fuel. Combustion of a portion of the waste rubber in gaseous form ensures the most complete combustion and the reduced formation of toxic compounds compared to direct combustion technologies for waste rubber.

The invention claimed is:

1. A method for producing carbon black from waste rubber, the method comprising:
   thermally decomposing the waste rubber in a reactor to provide decomposition products;
   separating the decomposition products into gas-vapor products and solid carbon residues;
   crushing the solid carbon residues to provide crushed carbon residues; and
   combusting the gas-vapor products with the crushed carbon residues by supplying the gas-vapor products and the crushed carbon residues into a combustion chamber,
   wherein the gas-vapor products and the crushed carbon residues supplied into the combustion chamber are in a mass ratio of between 1:(0.1-2.0).

2. The method for producing carbon black from waste rubber according to claim 1, wherein the gas-vapor products are burned with the crushed carbon residues in gaseous form or in liquid form after condensation.

3. The method for producing carbon black from waste rubber according to claim 2, wherein the gas-vapor products condensed in liquid form are separated into a first fraction having a boiling point less than or equal to 360° C. and a second fraction having a boiling point greater than 360° C., the first fraction being mixed with the crushed carbon residues in a mass ratio of 1:(0.1-2.0), the resulting mixture being burned, the combustion products being separated mechanically in a centrifugal force field into soot and ash.

4. The method for producing carbon black from waste rubber according to claim 3, wherein the second fraction undergoes thermal decomposition into soot and gas at temperatures between 850 and 2100° C.

5. The method for producing carbon black from waste rubber according to claim 3, wherein the combustion of the mixture of first fraction and carbon residues is carried out with an excess air coefficient between 0.20 and 0.35.

6. The method for producing carbon black from waste rubber according to any of the claim 1, wherein the carbon residues are crushed to produce particles of sizes between 0.1 and 2.0 mm.

7. The method for producing carbon black from waste rubber according to claim 1, wherein some or all of the crushed carbon residue is transported into the combustion chamber by means of gas-vapor products.

8. The method for producing carbon black from waste rubber according to claim 3, wherein the gases from the thermal decomposition of the second fraction and the combustion products of the mixture are burned together with the gas-vapor products, and the thermal energy produced is used for the thermal decomposition of the waste rubber in the reactor.

* * * * *